(12) United States Patent
Östergard

(10) Patent No.: US 7,903,921 B2
(45) Date of Patent: Mar. 8, 2011

(54) MANUFACTURING OF OPTICAL WAVEGUIDES

(75) Inventor: Toni Östergard, Turku (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/988,339

(22) PCT Filed: Jul. 7, 2005

(86) PCT No.: PCT/IB2005/001928
§ 371 (c)(1),
(2), (4) Date: Nov. 19, 2008

(87) PCT Pub. No.: WO2007/007134
PCT Pub. Date: Jan. 18, 2007

(65) Prior Publication Data
US 2009/0169152 A1 Jul. 2, 2009

(51) Int. Cl.
*G02B 6/10* (2006.01)
(52) U.S. Cl. ........................ 385/132; 264/1.24
(58) Field of Classification Search .............. 65/146, 65/147, 149, 151, 385, 386; 385/129–132; 264/1.24
See application file for complete search history.

(56) References Cited

U.S. PATENT DOCUMENTS

| 4,028,081 | A | * | 6/1977 | Marcatili | 65/392 |
|---|---|---|---|---|---|
| 5,298,366 | A | | 3/1994 | Iwasaki et al. | |
| 6,272,275 | B1 | | 8/2001 | Cortright et al. | |
| 6,292,563 | B1 | | 9/2001 | Clark | |
| 6,511,615 | B1 | | 1/2003 | Dawes et al. | |
| 7,050,691 | B2 | * | 5/2006 | Ishizaki et al. | 385/132 |
| 7,583,880 | B2 | * | 9/2009 | Anzures et al. | 385/129 |
| 7,604,758 | B2 | * | 10/2009 | Akutsu et al. | 264/1.24 |
| 2002/0048433 | A1 | | 4/2002 | Wu et al. | |
| 2002/0059716 | A1 | | 5/2002 | Kropp et al. | |
| 2002/0154863 | A1 | * | 10/2002 | Mizuno et al. | 385/43 |
| 2003/0174995 | A1 | | 9/2003 | Kaneko | |
| 2004/0131304 | A1 | | 7/2004 | Kondo | |
| 2004/0236200 | A1 | | 11/2004 | Say et al. | |
| 2007/0138663 | A1 | * | 6/2007 | Biegelsen | 264/1.24 |

FOREIGN PATENT DOCUMENTS

| DE | 10054373 | 5/2002 |
|---|---|---|
| EP | 1298462 | 4/2003 |
| JP | 11352344 | 12/1999 |
| WO | WO 98/21626 | 5/1998 |

* cited by examiner

*Primary Examiner* — Charlie Peng
(74) *Attorney, Agent, or Firm* — Alfred A. Fressola; Ware, Fressola, Van Der Sluys & Adolphson LLP

(57) ABSTRACT

Optical waveguide and manufacturing of an optical waveguide comprising embossing at least one groove into a first substrate by rolling, applying at least a second substrate into the groove and covering at least the groove with a third substrate such that the groove constitutes an optical waveguide for optical signal transmission.

35 Claims, 4 Drawing Sheets

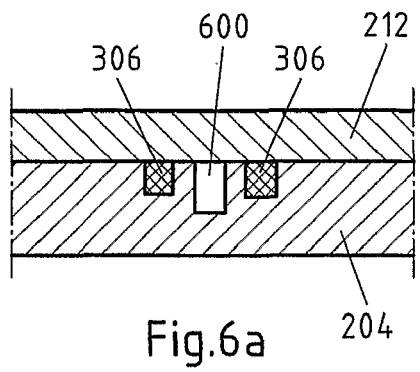
Fig.6a
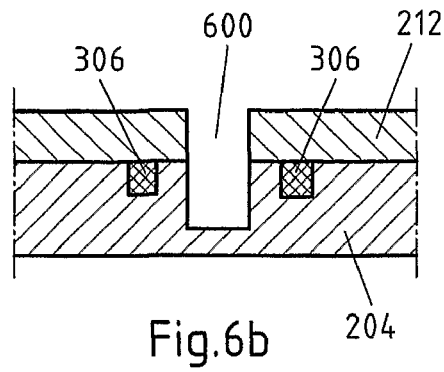
Fig.6b
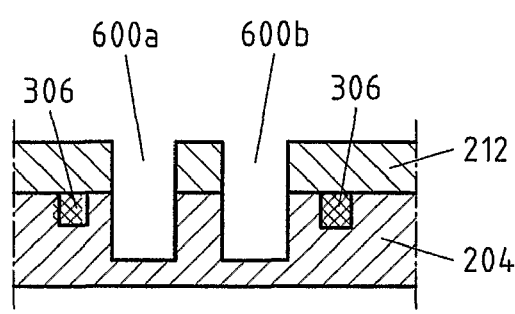
Fig.6c
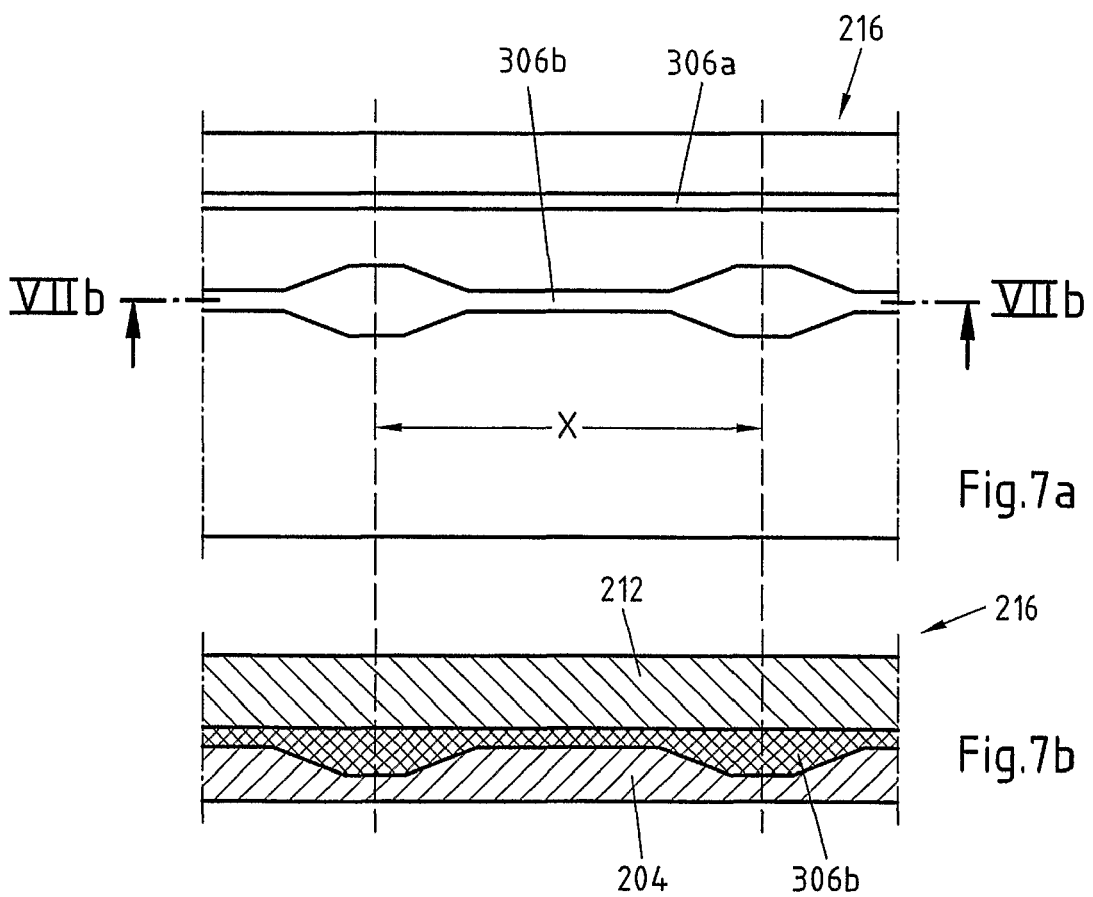
Fig.7a
Fig.7b

MANUFACTURING OF OPTICAL WAVEGUIDES

CROSS REFERENCE TO RELATED APPLICATIONS

This application is the U.S. National Stage of International Application Number PCT/IB05/001928 filed on Jul. 7, 2005 which was published in English on Jan. 18, 2007 under International Publication Number WO 2007/007134.

TECHNICAL FIELD

The present patent application relates in general to manufacturing optical waveguides by embossing.

BACKGROUND OF THE INVENTION

In the art, it is known to provide signal transmission using optical fibers. However, in small consumer devices optical data transmission is not a typical field of use of optical fibers. Due to the form factors in these devices, optical links may, however, be more suitable than electrical wiring.

Optical fibers as such are complicated in handling, and thus have not yet been used in consumer electronic devices, such as mobile phones.

Therefore, it is an object of the application to provide optical waveguides capable of optical signal transmission, in particular within mobile communication devices. It is another object of the application to provide an easy to implement, and easy to manufacture optical waveguide for optical signal transmission.

SUMMARY OF THE INVENTION

These and other objects are solved by a method for manufacturing optical waveguides comprising embossing at least one groove into a first substrate by rolling applying at least a second substrate into the groove, and covering at least the groove with a third substrate such that the groove constitutes an optical waveguide for optical signal transmission, according to a first aspect of the application.

By embossing the groove into the first substrate by rolling, the manufacturing of the optical waveguide is easy and cheap. The rolling allows a continuous manufacturing process, whereby various embossing technologies are possible.

The embossing can be carried out in a Roll-To-Roll, or Reel-To-Reel (R2R) process. The first substrate used in the Roll-To-Roll manufacturing can be a flexible plastic substrate or foil. Providing Roll-To-Roll processes, it is possible to laminate different foils together in one single process. Typical Roll-To-Roll technologies are rotogravure, off-set, flexible-printing, etc. A Roll-To-Roll process provides the advantage of being capable of manufacturing the grooves in a cheap manufacturing process.

The embossing of the groove can be carried out for example by providing a hot embossing process. In addition, it is possible to use a suitable pressure between two cylinders, where one surface pattern of a cylinder can correspond to the grooves desired to emboss. It is also possible to heat the substrate and/or the cylinders.

The size of the grooves may vary, for example between 10 μm to hundreds of μm, thus it is possible to provide single and/or multi-mode optical waveguides. The depth of the groove should not be significantly larger than the width of the groove, and it is preferred that the aspect ratio between width and depth is approximately 1. For simplicity reasons, a rectangular groove with 50 μm depth and 50 μm width is preferred. However, aspect ratios between 0.5 and 10 are also preferred.

The surface of the cylinder for embossing the grooves can be such that any form of groove is possible, for example linear, and/or curved. In case of a curved groove, the radius of the curves needs to obey optical principles of curved optical fibres in order to minimize leakage of light at the curve. The same applies for a minimum twisting or bending radius of the optical waveguide.

In order to provide optical and electrical data transmission, embodiments provide embossing at least one electrical conductor into the first substrate by rolling. This may be beneficial, if, for example, electrical power is needed to be transported, and the electrical conductors should be incorporated into the waveguide. The electrical conductors can be pressed into the first substrate, for example by using pressure and/or heat. The conductor may be any suitable conductor, ranging from a simple metal wire, to conducting inks/pastes, if preferred. The metal wire may also be a more complex conductor such as a very thin coaxial-wire, as well. The conductor(s) may also be pressed into the optical light-guide system as a final step, after the third substrate has been applied. That is, the conductor may be applied on top of the third substrate, or on the bottom of the first substrate.

To provide an optical pathway, it is preferred that the second substrate is applied into the grooves by at least one of screen printing, ink-jet printing, and/or spraying. The second substrate can be a liquid, which is applied into the groove. The second substrate can be applied onto the whole surface of the first substrate, and it can be possible to remove the excess of material, for example by grating, rasping, scratching, etc., for example using a "doctor blade".

In case the second substrate is a liquid, embodiments provide drying and/or hardening by polymerization of the second substrate after application into the groove. Polymerization can be carried out using an UV-lamp. It is preferred that the second substrate in its solid state has a higher optical refractive index than the optical refractive index of the first substrate.

Embodiments provide covering at least the groove with a third substrate by screen printing, ink-jet printing, spraying or laminating. The optical refractive index of the third substrate is preferably the same as of the first substrate.

In case the third substrate is a liquid, embodiments provide drying and/or hardening by polymerization of the third substrate after covering the groove. The third substrate may, according to embodiments, cover only the grooves, or the whole first substrate, or parts of the first substrate.

The optical waveguide is formed according to the application in a continuous process providing a continuous web of suitable optical waveguides. The individual optical fibre systems, with substrate with optical pathways within the groove, and possibly even electrical wiring, may then be cut out from the continuous web into suitable length. However, as cutting may cause shear forces and there is the risk that the "planes of shear" are not of best "optical quality", e.g. do not allow coupling-in/coupling-out optical signals without loss, cutting can be provided at positions, where the area of the groove with the second substrate is increased.

During cutting material of the first substrate, or the third substrate may be sheared into the area of the second substrate at the cutting plane, thus decreasing optical properties at these areas. To provide better optical coupling at the surfaces of the second substrate, embodiments provide that the area of the second substrate is increased by increasing the size of the groove at these positions. In-coupling and out-coupling may become better and scattering of light at the cutting planes is decreased.

The size of the optical waveguide often is small, in particular, when provided for small consumer electronic devices. Thus, the dimension requirements of the waveguide are tight. Several optical pathways may be required to be in close vicinity to each other. Having more than one groove in close vicinity to each other providing the optical pathways, there is a risk of cross talk. In order to reduce the risk of cross talk, embodiments provide embossing at least one non-guiding groove in between at least two grooves. The non-guiding, or "empty" groove can be achieved by not filling the grooves with second substrate, by using a non-guiding second substrate within the non-guiding grooves, or by providing a second embossing step, which embosses the "empty" groove through the third substrate, and the first substrate.

Another aspect of the application is an optical waveguide comprising a first substrate with at least one embossed groove made by rolling, the groove filled with a second substrate, and a third substrate covering at least the groove, such that the groove constitutes an optical waveguide for optical signal transmission A further aspect of the application is a system arranged for manufacturing optical waveguides, comprising an embossing roll arranged for embossing at least one groove into a first substrate, a first application unit arranged for applying at least a second substrate into the groove, and a second application unit arranged for covering at least the groove with a third substrate such that the groove constitutes an optical waveguide for optical signal transmission.

Further aspects of the application are mobile communication equipment comprising such an optical waveguide for data transmission, and the use of an optical waveguides as described above, in a consumer electronic devices for data transmission, in particular in mobile communication devices.

Further advantages may be derived from the dependent claims.

Following, embodiments of the application are described in more detail with respect to the enclosed Figures.

BRIEF DESCRIPTION OF THE DRAWINGS

In the Figures:

FIG. 6a-c illustrate sectional views of an optical waveguide with non-guiding grooves according to embodiments;

FIG. 7a illustrates a top view of an optical waveguide according to embodiments;

FIG. 7b illustrates a side view of an optical waveguide according to embodiments.

DETAILED DESCRIPTION OF THE DRAWINGS

Figure 1:
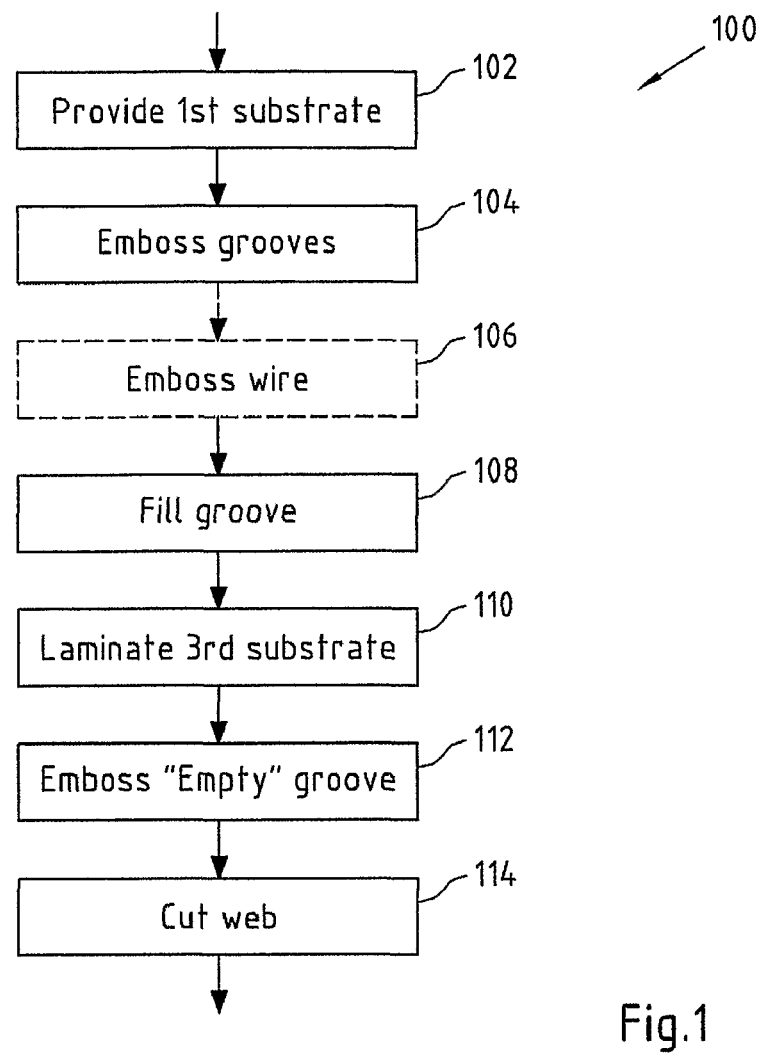
FIG. 1 illustrates a flowchart of a method according to embodiments.

FIG. 1 illustrates a flowchart of a method 100 according to embodiments.

Figure 2:
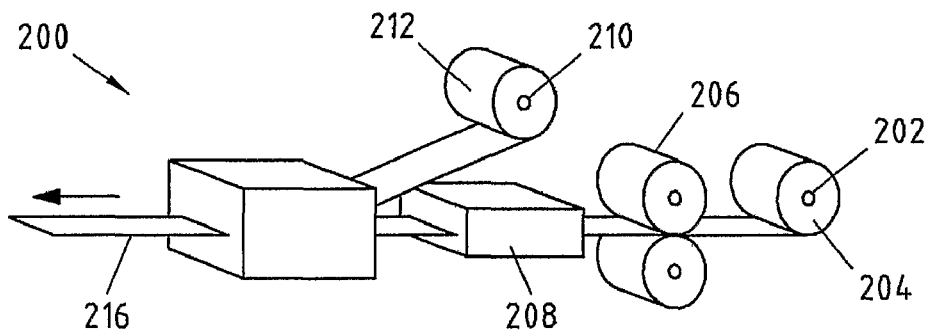
FIG. 2 illustrates a system for providing an optical waveguide according to embodiments.

FIG. 2 illustrates a system 200 for manufacturing an optical waveguide according to embodiments. The system 200 comprises a coil 202 for providing a first substrate, (material) 204, an embossing unit 206 with rolls for embossing grooves and/or electrical wires into the first substrate 204, a first application unit 208 for applying the second substrate, a second coil 210 for applying a third substrate 212, and a second application unit 214 for applying the third substrate 212 to provide an optical waveguide (optical fibre, optical light-guide) 216 according to embodiments.

Figure 3A:
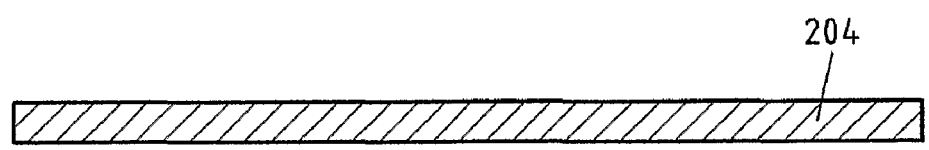
FIG. 3a-d illustrate sectional views of an optical waveguide after different processing steps.

The method 100 as illustrated in FIG. 1 first provides (102) the first substrate 204 from the coil 202 to the embossing unit 206. A sectional view of the first substrate 204 as provided from the coil 202 in step 102 is illustrated in FIG. 3a.

Figure 3B:
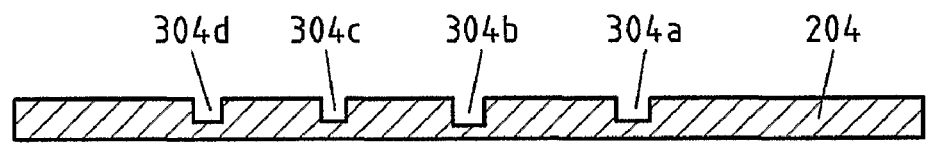

Within embossing unit 206 two embossing rolls emboss (104) grooves into the first substrate 204. The embossing unit 206 can be comprised of two embossing rolls, wherein a first embossing roll has a relief in accordance with the grooves to be applied, and a second roll has a plane surface. The embossing rolls can be arranged such that they apply heat and pressure onto the first substrate 204 to emboss grooves into the first substrate. The result of embossing the grooves into the first substrate 204 by embossing unit 206 is illustrated in FIG. 3b. FIG. 3b shows a sectional view of the first substrate 204 with grooves 306a-d. The position and size of the grooves can be chosen according to the needs of the optical waveguides.

After embossing the grooves (104), it is possible that electrical wires are also embossed (106). The embossing of the electrical wires (106) can be done in one step in embossing unit 206, wherein the embossing unit 206 for embossing grooves and electrical wires is illustrated in FIG. 4.

Figure 4:
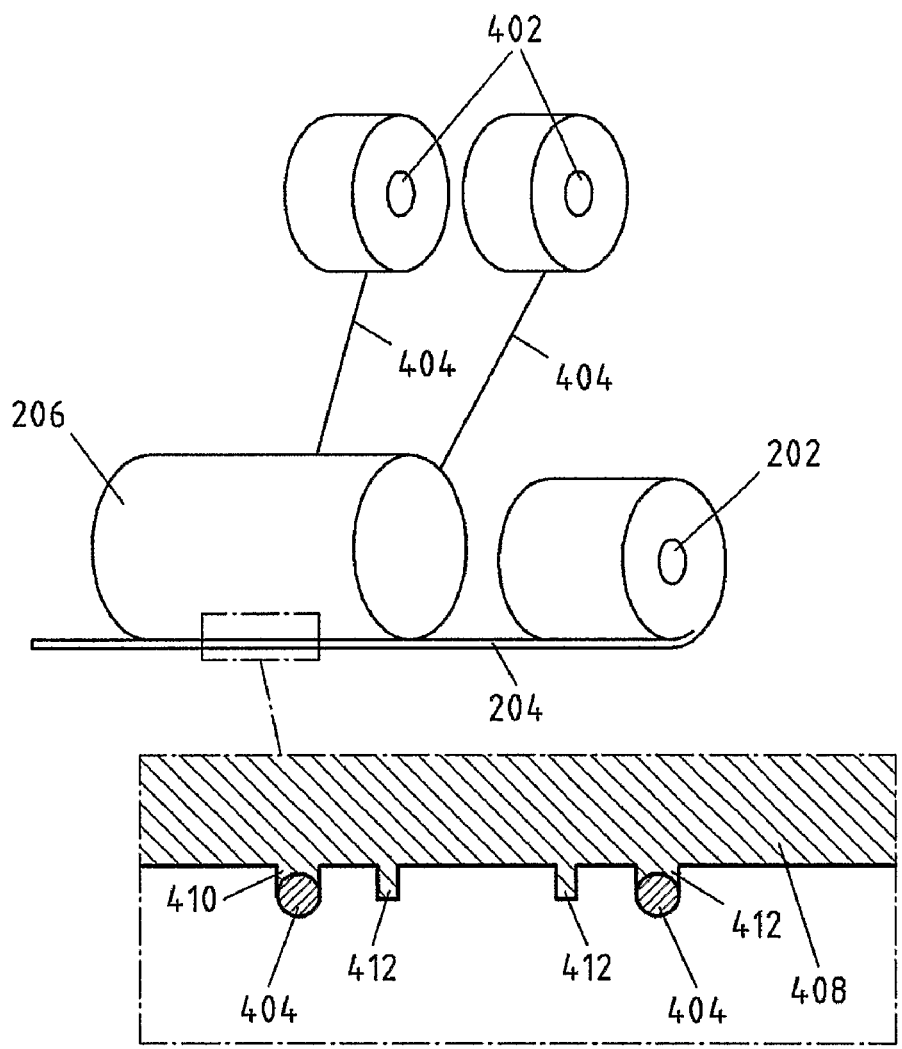
FIG. 4 illustrates embossing electrical wires into the first substrate according to embodiments.
Figure 5:
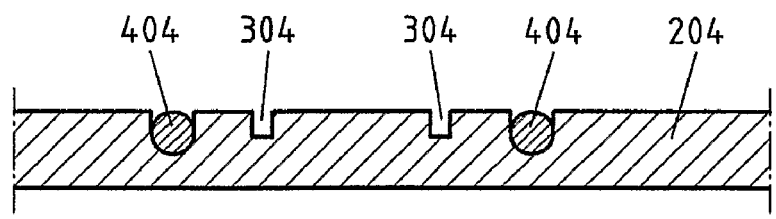
FIG. 5 illustrates a sectional view of a first substrate with embossed electrical wires.

The first substrate, as illustrated in FIG. 4, is provided from the first coil 202 to embossing unit 206. In addition, from coils 402, electrical wires 404 are provided to the embossing unit 206. Embossing unit 206 may have a surface 408 as illustrated. The surface 408 from the embossing roll may be such that the electrical wires 404 are held in position by positioning means 410. In addition, for embossing the grooves 304, protrusions 412 are provided. After embossing the grooves and the electrical wires 404 in embossing unit 206, the first substrate 204 has a sectional view as illustrated in FIG. 5. Besides the grooves 304, electrical wires 404 are embossed into the first substrate 204.

After having embossed the groove and/or the wires in steps 104, 106, the grooves are filled (108) with second substrate (material) in first application unit 208. Filling the grooves with the second substrate in the first application unit 208 can be carried out by spraying, ink-jet printing, or any other application process. The second substrate can be a liquid, which spreads onto the whole surface of the first substrate 204, and thus also into the grooves 304. After the grooves 304 are filled with the second substrate, excess of second substrate is removed from the surface of first substrate 204 in first application unit 208.

Figure 3C:
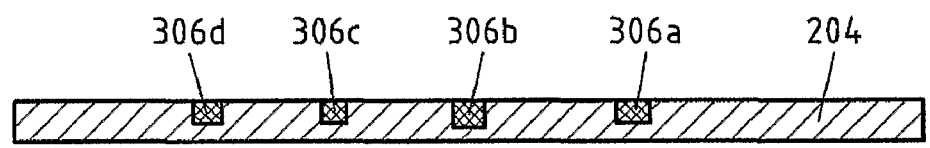
Figure 3D:
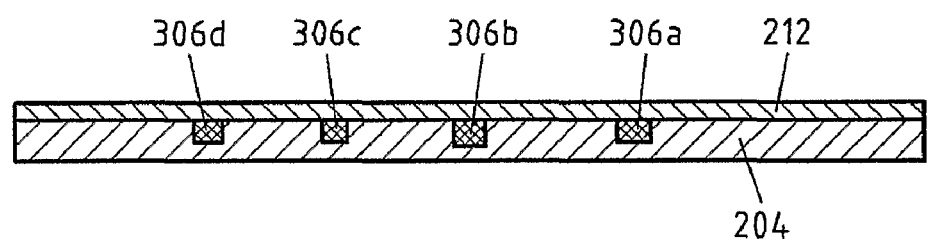

A sectional view of a resulting intermediate product is illustrated in FIG. 3c. As can be seen in FIG. 3c, the first substrate 204 now has filled grooves 306. The grooved are filled with the second substrate, which can be hardened by drying or by polymerization, for example by using an UV-lamp within first application unit 208. The optical refractive index of the second substrate in the filled grooves 306 is higher than the optical refractive index of the first substrate 204.

After having filled the grooves (108), a third substrate (material) is laminated (110) onto the first substrate 204 with the filled grooves 306. Therefore, from a second coil 210, the third substrate 212 is provided and applied within the second application unit 214 onto the first substrate 204. The third substrate 212 may have an optical refractive index, which is the same as of the first substrate 204. The output of second application unit 214 is an optical waveguide (optical fibre, optical light-guide) 216 in a continuous web.

A sectional view of such an optical waveguide 216 is illustrated in FIG. 3b. As can be seen, the first substrate 204 is laminated with the third substrate 212 along the whole surface. The filled grooves 306 are also covered by the third substrate 212.

In order to prevent cross talking between the optical pathways within the filled grooves 306, for example caused by bending of the optical waveguide 216 or curves within the grooves, empty grooves can be also embossed (112) into the optical waveguide 216. It is also possible to fill such grooves with material, which is opaque, at least for the wavelength of light used for data transmission within the waveguide.

The embossing (112) can be done in embossing unit 206, such that in first application unit 208 only particular grooves are filled with second substrate, and other grooves are not filled. FIG. 6a illustrates such an empty groove 600. As illustrated in FIG. 6a, the empty groove 600 is embossed into the first substrate 204 prior to laminating the first substrate 204 with the third substrate 212. This requires that in the first application unit 208 the second substrate is filled into the groove 306 by preventing filling the empty groove 600.

According to the method 100 illustrated in FIG. 1, the empty groove is embossed (112) after the third substrate is laminated (110) onto the first substrate. Such a groove configuration is illustrated in FIGS. 6b, c. As illustrated in FIG. 6b, the empty groove 600 is embossed through the third substrate 212, and the first substrate 204.

It is further possible that two empty grooves 600a, 600b are embossed in between two filled grooves 306.

After having embossed (112) the empty grooves, the optical waveguide is cut (114) to obtain optical waveguide systems according to current-needs.

FIG. 7a illustrates a top view of a continuous optical waveguide 216, where two filled grooves 306a, 306b are embossed. As can be seen, filled groove 306b varies in width. At the cutting lines x, the optical waveguide 216 is cut into pieces. As can be seen from FIG. 7a, the cutting line x lies at a position, where the width of filled groove 306b is larger than usual.

FIG. 7b shows a side view of the optical waveguide 216, illustrating that the depth of the filled groove 306 is also increased at the cutting line x. The increase in width and depth of the filled groove 306 at cutting line x provides that distortions due to shear forces applied onto the cutting line x are minimized when cutting the optical waveguide 216 into pieces, i.e. the effect of shear forces on the surface of the second substrate for coupling-in/coupling-out light is reduced. Optical in-coupling and out-coupling of light is improved at the positions with increased width and depth.

The application provides manufacturing of optical waveguide in an easy to handle and cheap way. The optical waveguides can be tailored to current needs, for instance, to be implemented into consumer electronic devices, such as mobile phones. The optical waveguide according to the application allows optical data transmission in an easy way. For instance in clam-shell mobile phones, the optical waveguide according to applications can be provided within hinges. This allows transmitting data from a main processor of a mobile communication device to a display, such as a TFT display.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
   embossing at least one groove into a first substrate by rolling;
   applying at least a second substrate into the groove; and
   covering at least the groove with a third substrate
   such that the groove constitutes an optical waveguide for optical signal transmission, and
   embossing at least one electrical conductor into the first substrate by rolling.

2. The method of claim 1, wherein embossing the groove comprises rolling the groove into the first substrate continuously.

3. The method of claim 1, wherein embossing the groove comprises rolling the groove into the first substrate by a roll-to-roll process.

4. The method of claim 1, wherein embossing the groove comprises applying heat onto the first substrate.

5. The method of claim 1, wherein embossing the groove comprises varying width and/or depth of the groove.

6. The method of claim 1, wherein the width-depth ratio of the groove is between 0.5-10.

7. The method of claim 1, wherein the width and/or depth of the groove is at least 10 μm.

8. The method of claim 1, wherein the width and/or depth of the groove is chosen to provide a single mode and/or multi-mode optical waveguide.

9. The method of claim 1, wherein embossing the groove comprises providing a linear and/or curved groove.

10. The method of claim 1, wherein applying the second substrate comprises at least one of
    A) screen printing;
    B) ink-jet printing; and
    C) spraying.

11. The method of claim 1, further comprising removing excess of second substrate after spraying.

12. The method of claim 1, further comprising drying and/or hardening by polymerization the second substrate after application into the groove.

13. The method of claim 1, wherein covering at least the groove with a third substrate comprises at least one of
    A) screen printing;
    B) ink-jet printing;
    C) spraying; and
    D) laminating.

14. The method of claim 1, further comprising drying and/or hardening by polymerization the third substrate after covering the groove.

15. The method of claim 1, wherein covering at least the groove with a third substrate comprises covering the whole first substrate.

16. An optical waveguide comprising:
a first substrate with at least one embossed groove made by rolling;
the groove filled with a second substrate; and
a third substrate covering at least the groove
such that the groove constitutes an optical waveguide for optical signal transmission, and
at least one electrical conductor embossed into the first substrate by rolling, wherein the groove filled with the second substrate has varying width and/or varying depth and at least one cutting position with increased width and/or increased depth of the groove filled with the second substrate, so that the width and/or the depth of the groove at the at least one cutting position decreases on both sides relative to said at least one cutting position.

17. The optical waveguide of claim 16, wherein the groove is a continuous groove within the first substrate.

18. The optical waveguide of claim 16, wherein the width-depth ratio of the groove is between 0.5-10.

19. The optical waveguide of claim 16, wherein the width and/or depth of the groove is at least 10 μm.

20. The optical waveguide of claim 16, wherein the width and/or depth is chosen to provide a single mode and/or multimode optical waveguide.

21. The optical waveguide of claim 16, wherein the groove is linear and/or curved.

22. The optical waveguide of claim 16, wherein the first substrate is a transparent and/or thermoplastic material.

23. The optical waveguide of claim 16, wherein the first substrate is a foil with a thickness of 0.1-5 mm.

24. The optical waveguide of claim 16, wherein the first substrate is a polymethylmethacrylate, polycarbonate, polyethylene, or polystyrene, or any derivate thereof.

25. The optical waveguide of claim 16, wherein the second substrate is a transparent and/or organic, or inorganic material.

26. The optical waveguide of claim 16, wherein the second substrate is a fluid capable of drying and/or hardening by polymerization.

27. The optical waveguide of claim 16, wherein the second substrate has an optical refractive index $\eta_2$ after drying and/or hardening by polymerization the second substrate which is higher than the optical refractive index $\eta_1$ of the first substrate.

28. The optical waveguide of claim 16, wherein the third substrate has an optical refractive index % equal to the optical refractive index $\eta_1$ of the first substrate.

29. The optical waveguide of claim 16, wherein the third substrate covers the whole first substrate.

30. A system comprising:
an embossing roll configured to emboss at least one groove into a first substrate;
a first application unit configured to apply at least a second substrate into the groove; and
a second application unit configured to cover at least the groove with a third substrate
such that the groove constitutes an optical waveguide for optical signal transmission, and
the system configured to emboss at least one conductor into the first substrate by rolling.

31. A mobile communication equipment comprising an optical waveguide of claim 16 for data transmission.

32. The mobile communication equipment of claim 31, wherein the optical waveguide is arranged to transport data within at least a hinge of a clam shell.

33. A use of an optical waveguide according to claim 16 in consumer electronic devices for data transmission, in particular in mobile communication devices.

34. The use of claim 33, wherein the optical waveguide is arranged to transport data within at least a hinge of a clam shell mobile communication device.

35. A system comprising:
means for embossing at least one groove into a first substrate;
means for applying at least a second substrate into the groove; and
means for covering at least the groove with a third substrate
such that the grove constitutes an optical waveguide for optical signal transmission, and
means for embossing at least one conductor into the first substrate by rolling.

* * * * *